United States Patent [19]
Bullinger

[11] 3,834,767
[45] Sept. 10, 1974

[54] TRAILER AUXILIARY HYDRAULIC BRAKE SYSTEM

[76] Inventor: David John Bullinger, Cayuta Rd., Van Etten, N.Y. 14889

[22] Filed: Mar. 26, 1973

[21] Appl. No.: 345,086

[52] U.S. Cl............... 303/7, 188/3 R, 188/112, 280/446 R, 303/2
[51] Int. Cl............................................ B60t 13/08
[58] Field of Search............ 303/7, 9, 13, 2, 10, 15, 303/20; 188/112, 3; 280/428, 446 R, 430

[56] References Cited
UNITED STATES PATENTS
2,051,522  8/1936  Graham .......................... 188/112
2,152,017  3/1939  Banning, Jr. ..................... 188/112

Primary Examiner—Trygve M. Blix
Assistant Examiner—D. C. Butler
Attorney, Agent, or Firm—Ernst H. Ruf

[57] ABSTRACT

A trailer auxiliary hydraulic brake system completely independent of the conventional brake system and including a wheel-driven hydraulic pump, an accumulator, a main brake control valve, a back-up release valve and a fluid reservoir. An automatic actuation member, responsive to a longitudinally slidable connection between the tractor and trailer, controls the flow of pressurized hydraulic fluid to and from the trailer brakes. The trailer auxiliary system, in addition to automatically energizing the trailer brakes, also includes an assembly for manual actuation of the main brake control valve thus permitting emergency braking, pulsating braking and use of the system as a parking brake.

6 Claims, 9 Drawing Figures

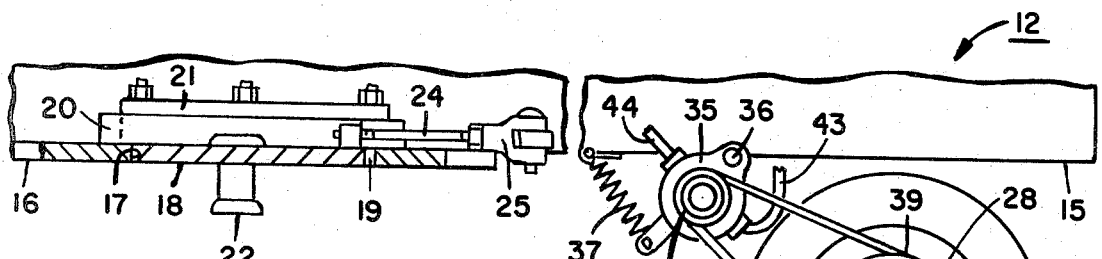
Fig. 1
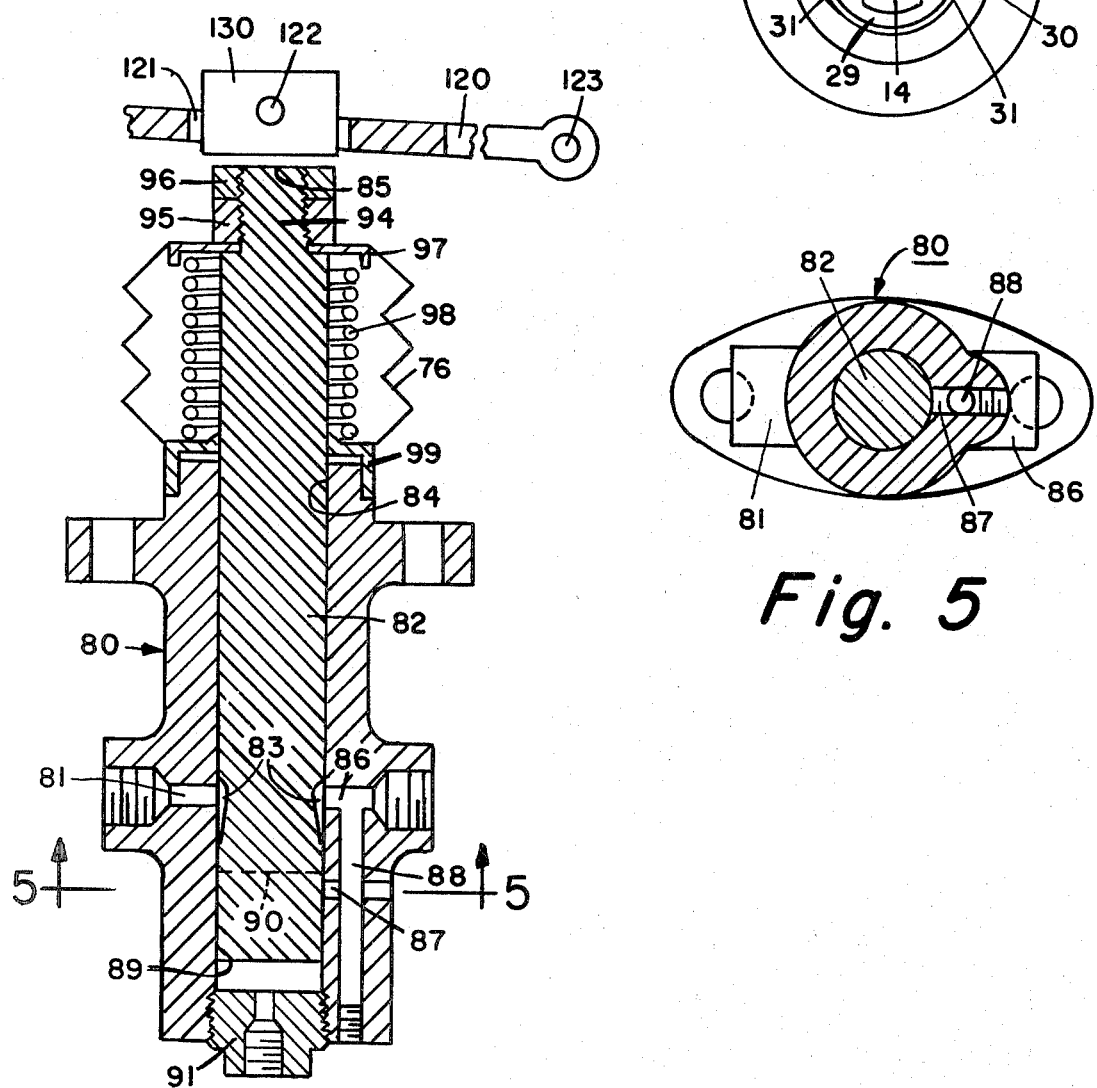
Fig. 4
Fig. 5

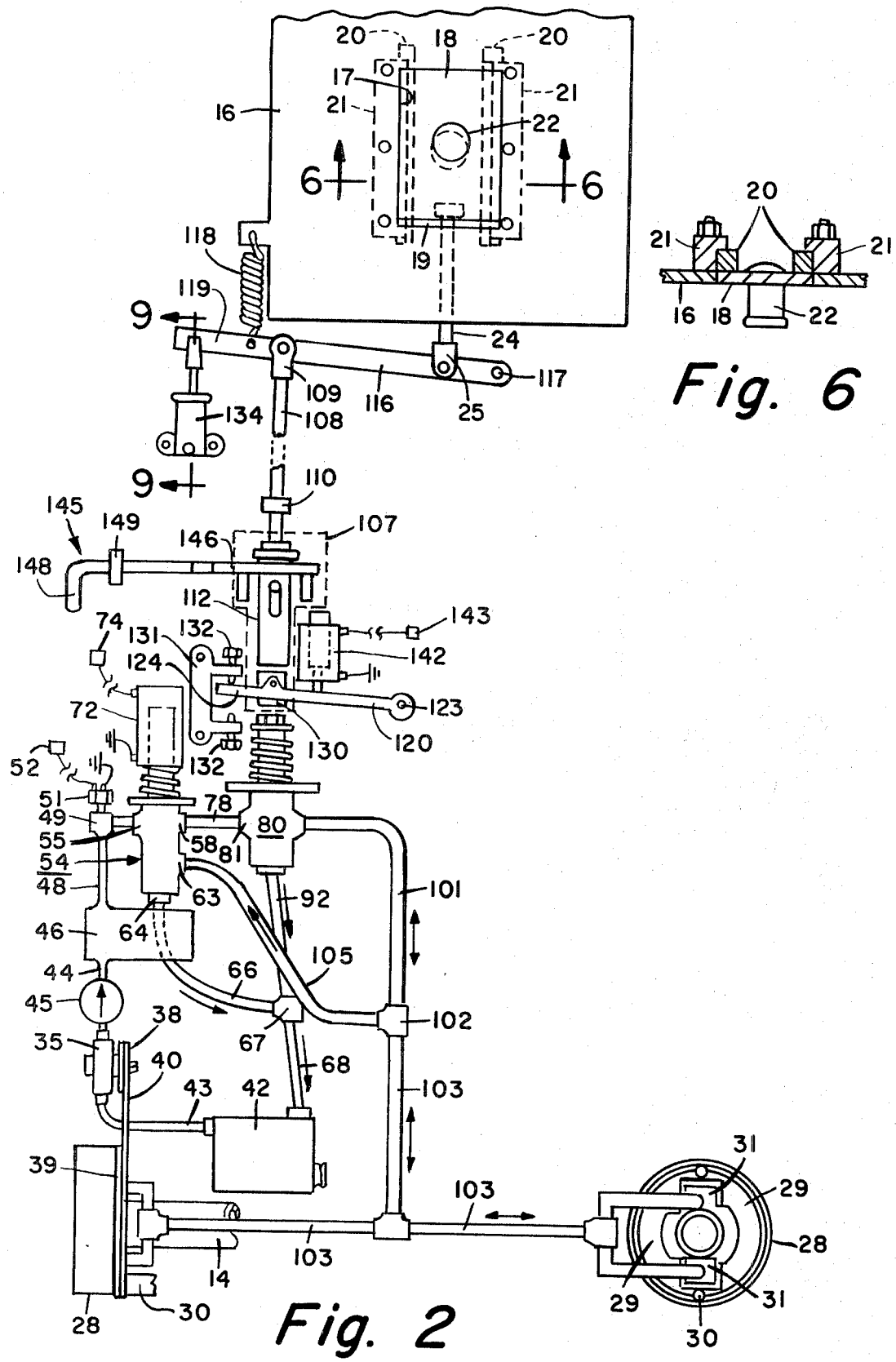

TRAILER AUXILIARY HYDRAULIC BRAKE SYSTEM

BACKGROUND OF THE INVENTION

1. Field of the Invention

This invention relates to a trailer auxiliary braking system for use with conventional truck trailers designed to be pulled by truck tractors. More specifically it pertains to a trailer auxiliary braking system that is completely independent of the conventional trailer braking systems and is useable in several modes, such as: automatically applying the brake on a downgrade and while coming to a stop, manually applying the brakes from the tractor cab in an emergency, in a pulsating manner, or as a parking brake.

2. Prior Art

The prior patent art is replete with various trailer auxiliary braking devices including among others those set forth in U.S. Pat. No. 2,051,522 to Graham; U.S. Pat. No. 2,152,017 to Banning, Jr.; U.S. Pat. No. 2,483,074 to Swain; U.S. Pat. No. 2,976,964 to Thompson; U.S. Pat. No. 3,139,956 to Ryan; and U.S. Pat. No. 3,301,607 to Collins et al. While all of these systems appear to be workable, none of these systems sets forth the novel combination of operating elements and modes of the trailer auxiliary brake system of this invention.

SUMMARY OF THE INVENTION

The instant invention sets forth a hydraulic trailer auxiliary brake system that is completely independent of all conventional driver-actuated air or vacuum brake systems. This trailer auxiliary brake system, which is wholly local to the trailer and acts only on the trailer wheel brakes, basically includes a wheel-driven hydraulic pump, an accumulator, a main brake control valve, a back-up release valve and a fluid reservoir, all of which are hydraulically interconnected with the trailer wheel brakes. Actuation of the main brake control valve is accomplished by an automatic actuation means that includes a plurality of interconnected or interacting push rods and levers responding to a longitudinally slidable connection between the truck tractor and the tractor trailer. When the connection between the tractor and trailer is shortened, due to over-riding of the trailer with reference to the tractor, the main brake control valve permits the flow of pressurized hydraulic fluid to the trailer brakes, thereby hydraulically energizing the trailer brakes. The back-up release valve disables the main brake control valve to permit movement of the trailer in a rearward direction. Means for remote manual actuation of the main brake control valve permit emergency braking, pulsating braking and use of the system as a parking brake. If desired, a lock-out means for the automatic actuation means permits only manual actuation of the main brake control valve. The system also includes means for modulating the automatic actuation means and means for controlling the rate of flow of hydraulic fluid through the main brake control valve.

Other advantages and features of the instant invention will be understood from the following description in conjunction with the attached drawings.

BRIEF DESCRIPTION OF THE DRAWING

FIG. 1 is a fragmentary side elevational view, partly in section, of the running gear of a single axle truck trailer, showing the sliding king pin plate, the hydraulic pump drive and the hydraulic brake cylinders.

FIG. 2 is a schematic bottom view layout or diagram of the entire trailer auxiliary brake system of this invention.

FIG. 4 is a longitudinal sectional view of the main hydraulic brake control valve shown in FIG. 2.

FIG. 5 is a cross-sectional view taken along line 5—5 of FIG. 4.

FIG. 6 is a cross-sectional view taken along line 6—6 of FIG. 2.

DESCRIPTION OF THE PREFERRED EMBODIMENTS

Figure 9:
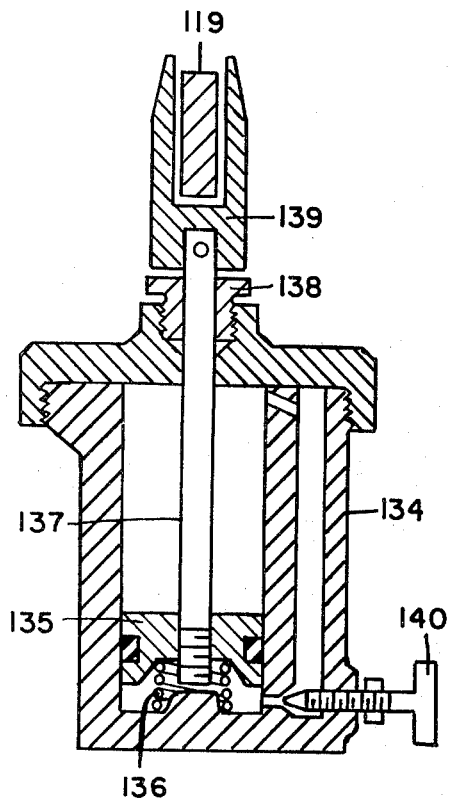
FIG. 9 is a cross-sectional view taken along line 9—9 of FIG. 2.

Referring now to the drawings in detail, FIG. 1 is a fragmentary side elevational view, partly in section, of the running gear of any conventional truck trailer 12 designed to be pulled by a truck tractor (not shown). For ease of illustration trailer 12 is shown as having but a single axle 14. As best seen in FIGS. 1, 2 and 6, frame or bed 15 of trailer 12 is provided with a bottom steel plate 16, having a generally rectangular cut-out 17, which receives another steel plate 18 that is longitudinally slightly shorter than cut-out 17 so that plates 16 and 18 are capable of longitudinally sliding, with reference to each other, for a predetermined distance 19, such as for example one half of an inch. Plate 18, which carries a conventional coupling or king pin 22 (for use with a standard tractor fifth wheel — not shown), also has two support bars 20 secured to its upper surface. Support bars 20, the ends of which extend beyond the front and rear edges of plate 18 and rest on the top face of plate 16, are slidingly received between angle bars 21 which in turn are secured to plate 16 as best seen in FIG. 6. The front end of a push rod 24 is securely attached to the upper surface of fixed plate 18 near its rear end, with the rear end of push rod 24 being provided with a yoke 25. Thus, plate 16 (together with trailer 12) and plate 18 can move fore and aft, for a predetermined distance 19, with reference to each other.

FIG. 1 also shows that axle 14 is provided with a conventional wheel 26 and tire 27, with wheel 26 being bolted to a conventional brake drum 28, with brake shoes 29, air brake cam shafts 30 and hydraulic wheel cylinders 31 being part of a brake assembly that is secured to trailer axle 14 (as best seen in FIG. 2).

A high pressure hydraulic pump 35, which is pivotally attached to trailer frame 15 at 36 and tensioned by spring 37, is driven by a V-belt (or chain) 40 running over pulleys 38, 39 on pump 35 and brake drum 28 respectively. Either pump 35 is a one-way pump or pump pulley 38 is a free-wheeling type so that pump 35 is driven only when trailer 12 is travelling in a forward direction. As best seen in FIG. 2, pump 35, which has its intake side connected to a brake fluid reservoir 42 by pipe or hose 43, discharges on its outlet side through a pipe or hose 44 and a check valve 45 into an accumulator 46 which is maintained (by pump 35) at a pressure of about 1,000 psi.

From accumulator 46, the brake fluid flows through pipe 48 and T-fitting 49 into inlet port 55 of back-up release valve 54. Also attached to one arm of fitting 49 is a pressure switch 51 which in turn is connected to an indicator light or gauge 52 in the truck tractor cab (not shown).

Figure 3:
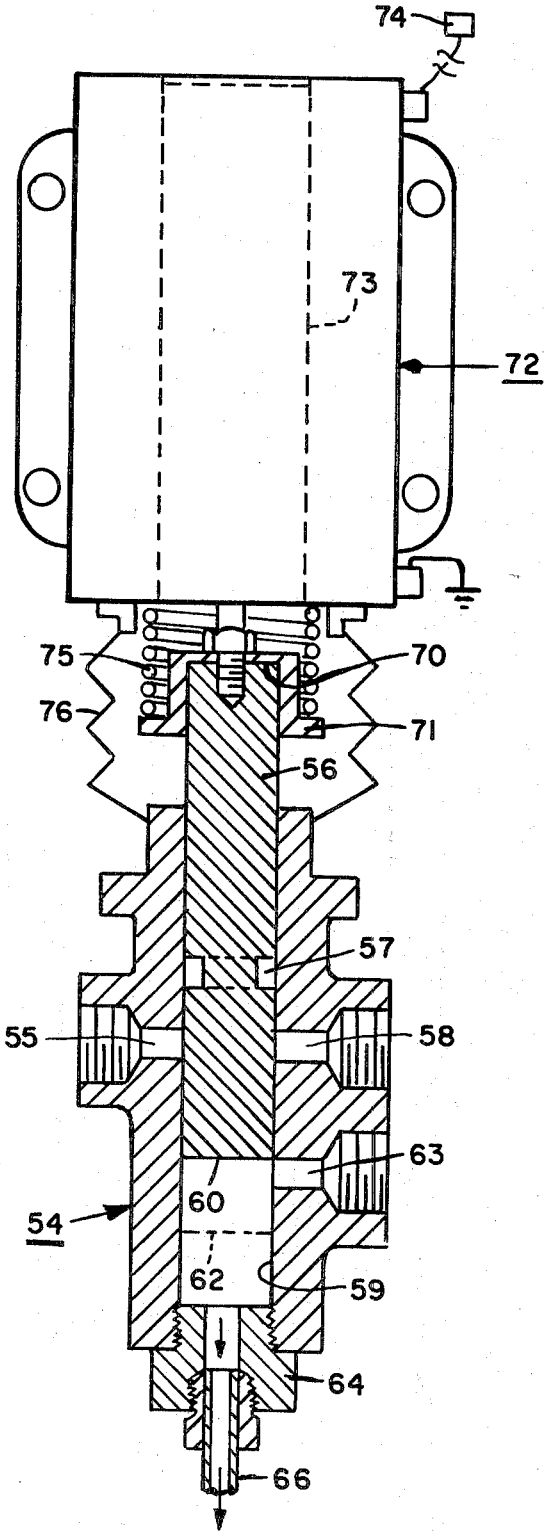
FIG. 3 is a longitudinal sectional view, of the back-up release control valve shown in FIG. 2, as attached to the back-up solenoid.

Back-up release valve 54, which is shown in detail in FIG. 3 and is shown in the back-up position, has a spool 56 that is axially movable within valve body bore 59. Valve inlet port 55 is located directly opposite from valve outlet port 58, with ports 55 and 58 communicating via spool groove 57 when spool 56 is in its normal or rest position, i.e., when spool lower end face 60 is in the position indicated by dashed line 62 in FIG. 3. Valve 54 also has a release port 63 that communicates with valve bore 59 in the back-up release position, but is covered when spool 56 is in its normal position. Valve 54 is further provided, on its lower extremity, with an apertured discharge bushing 64 which permits communication of valve bore 59, via pipe 66, T-fitting 67 and pipe 68, with brake fluid reservoir 42. The upper end face 70 of spool 56 is provided with a flange 71 and is also attached to core 73 of solenoid 72, with solenoid 72 being connected to the back-up light circuit or separate switch 74 in the tractor cab (not shown). A biasing spring 75, which is interposed between solenoid 72 and flange 71 as well as covered by dust-proof boot 76, biases spool 56 into its normally-open or rest position, with solenoid core 73 (upon actuation) moving spool 56 into the back-up position shown in FIG. 3.

From valve outlet port 58, or release valve 54 (when valve spool 56 is in its normal position), the brake fluid flows through pipe 78 into inlet port 81 of main brake control valve 80 shown in detail in FIGS. 4 and 5. Valve 80 has a spool 82 that is axially movable within valve body bore 84, with spool 82 being shown in FIG. 4 in its brake-applying or "on" position. Valve inlet port 81 is located directly opposite from valve outlet port 86, with port 86 also being connected near its outer end with a vent port 87 directly therebelow by means of passage 88. When spool 82 is in the "on" position, inlet port 81 and outlet port 86 communicate via tapered spool groove 83, with vent port 87 being blocked off by spool 82. When spool 82 is in its "off" or released (closed) position, i.e., when spool lower end face 89 is in the position indicated by dashed line 90, vent port 87 is uncovered, but communication between ports 81 and 86 is blocked. However, in this position there is communication between the outer end of port 86 and valve bore 84 via passage 88 and vent port 87. Control valve 80 is also provided, on its lower extremity, with an apertured discharge bushing 91 which permits communication, via pipe 92, T-fitting 67 and pipe 68, of valve bore 84 with brake fluid reservoir 42. The upper portion of spool 82 extends from valve bore 84 and is provided with a threaded end section 94 of reduced thickness having secured thereto, by means of nut 95 and lock nut 96, a spring retainer washer 97. A biasing spring 98 (preferably covered by another boot 76) is interposed between washer 97 and a seal retainer cup 99, with spring 98 biasing spool 82 into its normal "off" or released position.

From the outer end of valve outlet port 86, of main brake control valve (when valve spool 82 is in its "on" position as shown in FIG. 4), the brake fluid flows through pipe 101 and T-fitting 102 into piping or tubing circuits 103 that lead to all wheel brake cylinders 31. While only a single axle trailer is shown, it is understood that any number of additional axles, having hydraulic brake cylinders, may be added to circuits 103. T-fitting 102 is also connected via pipe or tube 105 to release port 63 in back-up release valve 54 (with port 63 however being blocked off when valve 54 is in its normal position).

Figure 7:
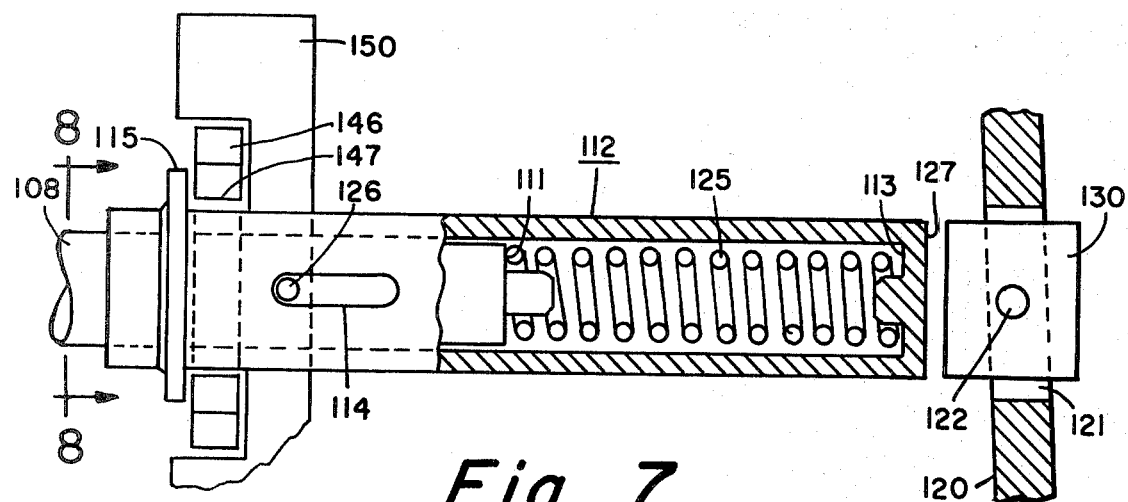
FIG. 7 is an enlarged side elevational view, partly in section, of those parts of FIG. 2 within the area enclosed by dashed line 107.

Actuation of spool 82 of main brake control valve 80 is accomplished by means of a plurality of interconnected or interacting push rods 24, 108 and 112, as well as levers 116 and 120 which will now be described in more detail. Lever 116, the inner end of which is pivotally secured to trailer frame 15 with pin 117, is also pivotally secured to both yoke 25 on the rear end of push rod 24 and yoke 109 on the front end of push rod 108. In addition, lever 116 is also connected to and biased toward plate 16 by lever return spring 118. Push rod 108, which passes through a support bearing 110, has its rear end position (see FIG. 7) slidingly received within hollow push rod 112. A heavy compression spring 125 is interposed between rear end surface 111 of rod 108 and rear inner surface 113 of push rod 112. The amount of sliding motion between rods 108 and 112 is limited by the length of longitudinal slots 114 in rod 112, with pin 126, which extends transversely through and beyond rod 108, being receivable therein. Hollow push rod 112 is also provided with a collar or annular flange 115 near the front end thereof.

Interposed between the upper surface 85 of main brake control valve spool 82 and the rear outer surface 127 of push rod 112 is a permanent magnet 130. Permanent magnet 130, which extends through an aperture or slot 121, in lever 120, is also attached to lever 120 by means of a pivot pin 122 that extends through magnet 130 and has its ends secured to lever 120. Lever 120, the inner end of which is pivotally secured or hinged to trailer frame 15 with pin 123, has its outer end 124 receivable between adjustable set screws 132 of the parallel leg portions of channel member 131. Adjustment of set screws 132 controls the rate of flow of hydraulic fluid through tapered spool groove 83 by controlling the stroke of main brake control valve spool 82. While lever 120 is generally pivoted by the actions of main brake valve spool 82 or push rod 112, it may also be pivoted by emergency solenoid 142 which, while being attached to trailer frame 15, is connected to and controlled by a switch 143 in the tractor cab (not shown).

Checking the action of lever 116 (FIG. 2) is dashpot 134, which is shown in detail in FIG. 9. Dashpot 134, which is attached to trailer frame 15 and which may be of substantially conventional construction and operation, includes piston 135, piston return spring 136 and piston rod 137, with the outer end of rod 137 extending through packing 138 and having forked member 139 attached thereto. Adjustable needle valve 140 regulates the speed of dashpot 134. Forked member 139 engages the sides and rear edge of outer end 119 of lever 116.

Figure 8:
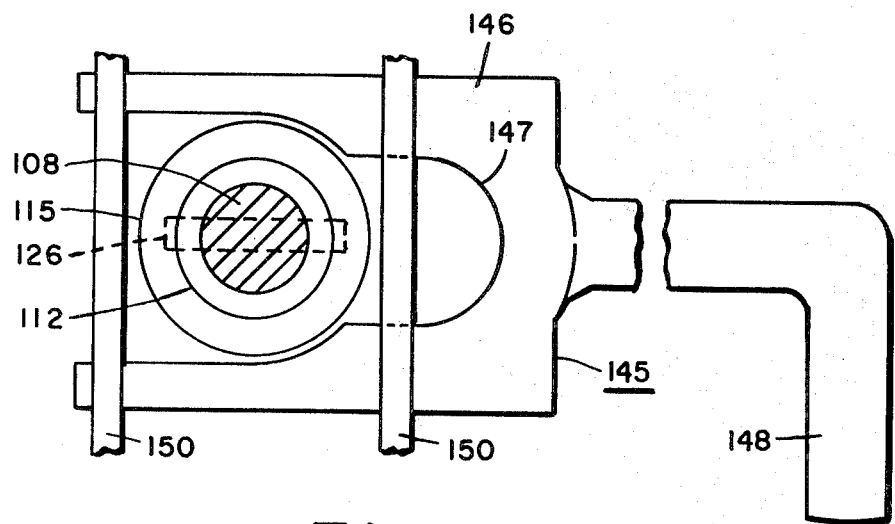
FIG. 8 is a cross-sectional view taken along line 8—8 of FIG. 7.

As previously noted, main brake control valve spool 82 is actuated by means of interacting push rods 24, 108 and 112, as well as levers 116 and 120. Also as noted, spool 82 may be actuated by emergency solenoid 142 and lever 120. In order to permit this independent actuation (by solenoid 142) the normal action of push rod 112 upon lever 120 is prevented by a lock-out device or means 145 shown in FIGS. 2, 7 and 8. Lock-out means 145, which is attached to trailer frame 15, consists of a sliding fork 146 having an arcuate portion 147 engageable, in one position, with collar 115 of push rod 112. Lock-out means 145, which is slidable on guide plates 150, is shown as being actuable by handle 148 passing through a support member 149. Means 145, if desired, could also readily be remotely actuated from the tractor cab by utilizing a switch-controlled solenoid (not shown), for example, in addition to handle 148.

Now that all of the components of the trailer auxiliary brake system of this invention have been described in detail, its various modes of operation will be set forth.

Hydraulic brake fluid, which is pumped by hydraulic pump 35 only as the truck trailer moves forward, is maintained in accumulator 46 at about 1,000 psi. From accumulator 46 the brake fluid passes through normally-open back-up release valve 54 into normally-closed main brake control valve 80. When trailer 12 starts down a grade or a hill, trailer 12 pushes forward (in relation to the truck tractor) thus causing longitudinal sliding movement of plate 16 relative to plate 18. This longitudinal movement, through the distance 19, is transferred by means of push rods 24, 108 and 112 as well as levers 116, 120 and permanent magnet 130, to main brake control valve 80 whose spool 82 is thereby moved from its normally-closed into its brake-applying or "on" position. As previously noted, when it is in its "on" position, valve 80 permits the high pressure brake fluid to flow therethrough (via ports 81 and 86) to piping circuits 103 (via pipe 101 and fitting 102) and thereby automatically applies the trailer brakes.

When the trailer returns to a level road stretch (or starts up a grade), plate 18 is pulled longitudinally forward relative to plate 16 with this movement 19, which is also aided by lever return spring 118, causing hinged lever 120 to also be pulled forward (via push rods 24, 108 and 112 as well as lever 116). While there is no direct mechanical connection between push rod 112, lever 120 and spool 82 of valve 80, permanent magnet 130 together with valve biasing spring 98 pulls spool 82 forward and thus moves spool 82 into its "off" or closed position. In this closed position communication between pots 81 and 86 is blocked but communication is established between valve 80 and reservoir 46 (via ports 86 and 87; fittings 91 and 67; as well as pipes 92 and 68). Thus, all brake cylinders 31 are vented and the brake fluid is returned to the reservoir. This application and subsequent release of the trailer brakes is entirely automatic and independent of the driver, i.e., as soon as trailer 12 moves forward relative to the tractor, the trailer brakes are automatically hydraulically energized by the system of this invention.

It should be noted, however, that this system is entirely independent of the standard air braking system that is generally used on trailers. In normal braking on level ground this emergency system will not come into operation because the tractor and the trailer are braked simultaneously and there is generally very little relative movement between the tractor and the trailer. In addition, the use of dashpot 134 checks or modulates the action of lever 116 so that the brakes are not applied jerkily and are not applied when trailer 12 goes down a short decline or a dip in the road.

Back-up release valve 54 (best shown in FIGS. 2 and 3) operates in the following manner: When the truck driver shifts the tractor transmission into reverse, the back-up light circuit on trailer 12 is actuated. Since solenoid 72 of valve 54 is wired into this back-up light circuit, solenoid core 73 pulls valve spool 56 longitudinally forward (as shown in FIG. 3) thus blocking communication between ports 55 and 58 and retaining pressure in accumulator 46. At the same time, release port 63 is uncovered which releases the fluid pressure in all pipe circuits 103, with the brake fluid returning to reservoir 42 via pipes 105, 66 and 68. When the driver shifts out of reverse, biasing spring 75 returns valve spool 56 to its normally open position (which closes port 63 and re-establishes communication between ports 55 and 58). The object of the back-up release valve 54 of course is to prevent the automatic application of the brakes while trailer 12 is being backed up.

In the present commercially used trailer air brake systems (not shown), if one of the air hoses between the relay valve and the air brake chambers leaks or breaks, or if any of the brake diaphragms rupture, or if moisture in the relay valve freezes, then all of the air brakes (including the emergency air brakes) on the trailer will fail. This total brake failure, which is the major cause of all tractor-trailer wrecks, is prevented by the auxiliary brake system of this invention.

Even if the brakes on the tractor fail, the driver can still stop trailer 12 by throwing switch 143 (in the tractor cab) which causes emergency solenoid 142 to push lever 120 and consequently valve spool 82 into brake-applying or "on" position. Thus, the auxiliary brake system of this invention, in addition to its previously described automatic functioning, can also function as an emergency brake system.

If desired, the brake system of this invention can also be used, in the manner of the emergency function just described, on wet or snow covered roads when it may be desirable to only brake the trailer (in a pulsating manner, if so desired) to avoid jacknifing of tractor-trailer combination. In addition, the brake system, when used in the manner of the emergency function, can also act as an emergency parking brake.

If it is desired to operate the brake system of this invention in a manual or intermittent manner, this can be accomplished by the use of lock-out means 145. Arcuate portion 147 of sliding fork 146 engages collar 115 of plush rod 112, thereby preventing both longitudinal movement of push rod 112 and subsequent actuation of valve spool 82 in main brake control valve 80. Even through push rod 112 is immobilized against longitudinal movement, push rods 24 and 108 as well as lever 116, are still movable, with this movement however being taken up by compression spring 125 (FIG. 7) interposed between rod 108 and rod 112. Spring 125 however has sufficient tension that it will not compress when the brake system of this invention is used in its automatic mode as previously described. Furthermore, the brake system can be used as an emergency system (by means of switch 143, solenoid 142 and lever 120) regardless of the position (either manual or automatic) of lock-out means 145.

The hydraulic auxiliary brake system of this invention relates to commercial trailer brakes for tractor trailers, with this system being useable in several modes, such as: automatically applying the brakes on a down grade and while coming to a stop; manually applying the brakes from the tractor cab, either in an emergency situation or for example on snow-covered roads in a pulsating manner. In addition, the system includes means to release the automatic braking action while backing up the trailer and it may also be used as a parking brake. Furthermore, while the brake system of this invention may be used in conjunction with the conventional air or vacuum brakes, it is completely independent therefrom.

While the invention has been described in connection with possible forms or embodiments thereof, it is to be understood that the present disclosure is illustrative rather than restrictive and that further changes or modifications may be resorted to without departing from the spirit of invention or scope of the claims which follow.

What is claimed is:

1. In the combination of a truck tractor having a fifth wheel mount and a tractor trailer having a king pin secured to said mount, said trailer also including wheels having a conventional air or vacuum brake system and controls therefor, the addition of an independent auxiliary hydraulic braking system for said trailer wheel brakes, said hydraulic system being wholly local to said trailer and including:
    a. means for generating hydraulic fluid under pressure when said trailer is travelling in a forward direction;
    b. accumulator means for storing said pressurized fluid;
    c. first valve means for controlling the flow of said pressurized hydraulic fluid to and from said trailer brakes;
    d. a longitudinally slidable connection between said tractor and trailer; and
    e. means for automatically actuating said first valve means, responsive to said slidable connection when said connection is shortened due to over-riding of said trailer with reference to said tractor, to permit the flow of pressurized hydraulic fluid to said trailer brakes thereby hydraulically energizing said trailer brakes, wherein said independent hydraulic braking system for said trailer wheels further includes:
    1. second valve means for disabling said first valve means; and
    2. means for actuating said second valve means upon movement of said trailer in a rearward direction.

2. In the combination of claim 1 wherein said independent hydraulic braking system for said trailer wheels further includes means for manual remote actuation of said first valve means, for hydraulically energizing said trailer brakes for emergency braking and for use as a parking brake.

3. The combination of claim 2 wherein said independent braking system for said trailer wheels further includes lock-out means for said automatic actuation means (for said first valve means) so as to permit only manual actuation of said first valve means.

4. In the combination of claim 1 wherein said independent hydraulic braking system for said trailer wheels further includes a hydraulic fluid reservoir that is hydraulically connected with said means for generating hydraulic fluid under pressure, as well as said first and second valve means.

5. In the combination of claim 4 wherein said second valve means in one position, is hydraulically interconnected between said accumulator means and said first valve means and in another position is hydraulically interconnected between said trailer wheel brakes and said hydraulic fluid reservoir.

6. In the combination of claim 4 wherein said first valve means, in one position, is hydraulically interconnected between said accumulator means, via said second valve means, and said trailer wheel brakes and in another position is hydraulically interconnected between said trailer wheel brakes and said hydraulic fluid reservoir.

* * * * *